United States Patent
Weers et al.

(10) Patent No.: US 11,485,915 B2
(45) Date of Patent: *Nov. 1, 2022

(54) METHODS OF USING IONIC LIQUIDS AS CORROSION INHIBITORS

(71) Applicant: Baker Hughes Holdings LLC, Houston, TX (US)

(72) Inventors: Jerry Weers, Richmond, TX (US); Mary Jane Felipe, Houston, TX (US)

(73) Assignee: Baker Hughes Holdings LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/545,910

(22) Filed: Dec. 8, 2021

(65) Prior Publication Data

US 2022/0098494 A1    Mar. 31, 2022

Related U.S. Application Data

(63) Continuation of application No. 16/509,431, filed on Jul. 11, 2019, now abandoned.

(60) Provisional application No. 62/696,544, filed on Jul. 11, 2018.

(51) Int. Cl.
| | | |
|---|---|---|
| C23F 11/14 | (2006.01) | |
| C02F 1/68 | (2006.01) | |
| C09K 8/524 | (2006.01) | |
| C02F 101/20 | (2006.01) | |
| C02F 101/32 | (2006.01) | |
| C02F 103/10 | (2006.01) | |
| C10G 33/04 | (2006.01) | |
| C09K 15/20 | (2006.01) | |
| C09K 15/26 | (2006.01) | |
| C09K 15/30 | (2006.01) | |
| B01D 17/04 | (2006.01) | |
| C10L 1/236 | (2006.01) | |
| C10L 10/04 | (2006.01) | |
| C10L 10/16 | (2006.01) | |
| B01J 43/00 | (2006.01) | |
| C08G 8/12 | (2006.01) | |
| C10G 29/24 | (2006.01) | |
| C10G 29/28 | (2006.01) | |

(52) U.S. Cl.
CPC .......... *C10G 33/04* (2013.01); *B01D 17/047* (2013.01); *B01J 43/00* (2013.01); *C02F 1/682* (2013.01); *C08G 8/12* (2013.01); *C09K 8/524* (2013.01); *C09K 15/20* (2013.01); *C09K 15/26* (2013.01); *C09K 15/30* (2013.01); *C10G 29/24* (2013.01); *C10G 29/28* (2013.01); *C10L 1/236* (2013.01); *C10L 10/04* (2013.01); *C10L 10/16* (2013.01); *C23F 11/149* (2013.01); *C02F 2101/20* (2013.01); *C02F 2101/32* (2013.01); *C02F 2103/10* (2013.01); *C02F 2303/22* (2013.01); *C10G 2300/104* (2013.01); *C10G 2300/107* (2013.01); *C10G 2300/1011* (2013.01); *C10G 2300/1037* (2013.01); *C10G 2300/1055* (2013.01); *C10G 2300/1059* (2013.01); *C10G 2300/1077* (2013.01); *C10G 2300/202* (2013.01); *C10G 2300/205* (2013.01); *C10G 2300/206* (2013.01); *C10G 2300/304* (2013.01); *C10G 2300/4075* (2013.01); *C10G 2300/80* (2013.01); *C10G 2400/02* (2013.01); *C10G 2400/04* (2013.01); *C10L 2200/0438* (2013.01); *C10L 2200/0446* (2013.01); *C10L 2270/026* (2013.01)

(58) Field of Classification Search
CPC ........ C10G 33/04; C10G 29/24; C10G 29/28; C10G 2300/1011; C10G 2300/1037; C10G 2300/104; C10G 2300/1055; C10G 2300/1059; C10G 2300/107; C10G 2300/1077; C10G 2300/202; C10G 2300/205; C10G 2300/206; C10G 2300/304; C10G 2300/4075; C10G 2300/80; C10G 2400/02; C10G 2400/04; C10G 31/08; B01D 17/047; B01J 43/00; C02F 1/682; C02F 2101/20; C02F 2101/32; C02F 2103/10; C02F 2303/22; C08G 8/12; C09K 8/524; C09K 15/20; C09K 15/26; C09K 15/30; C09K 8/58; C10L 1/236; C10L 10/04; C10L 10/16; C10L 2200/0438; C10L 2200/0446; C10L 2270/026; C23F 11/149

See application file for complete search history.

(56) References Cited

U.S. PATENT DOCUMENTS

| | | | | |
|---|---|---|---|---|
| 6,924,253 B2 * | 8/2005 | Palmer | .................. | C09K 8/528 |
| | | | | 507/927 |
| 2010/0120638 A1 * | 5/2010 | Del Gaudio | ........... | C09K 8/607 |
| | | | | 73/866 |
| 2011/0266504 A1 * | 11/2011 | Fransaer | .................. | C25D 5/34 |
| | | | | 252/500 |
| 2012/0121485 A1 * | 5/2012 | Rogers | ................ | C10G 25/003 |
| | | | | 548/402 |
| 2013/0280151 A1 * | 10/2013 | Lee | ...................... | B01J 20/3204 |
| | | | | 423/247 |

(Continued)

FOREIGN PATENT DOCUMENTS

WO    WO-2007101397 A1 *  9/2007    ......... B01D 53/1456

*Primary Examiner* — Pamela H Weiss
(74) *Attorney, Agent, or Firm* — John Wilson Jones; Jones Delflache LLP

(57) ABSTRACT

Ionic liquid containing compositions may be used in the production, recovery and refining of oil and gas. In addition, they may be used to treat cooling water and/or to inhibit and/or prevent corrosion of metals.

15 Claims, No Drawings

(56) References Cited

U.S. PATENT DOCUMENTS

| | | | |
|---|---|---|---|
| 2015/0118104 A1* | 4/2015 | Marin Cruz | C07D 233/64 |
| | | | 548/335.1 |
| 2015/0218434 A1* | 8/2015 | Huo | C09K 8/524 |
| | | | 507/90 |
| 2016/0160142 A1* | 6/2016 | Reid | F02M 25/00 |
| | | | 548/542 |

* cited by examiner

METHODS OF USING IONIC LIQUIDS AS CORROSION INHIBITORS

This is a continuation of U.S. patent application Ser. No. 16/509,431 filed on Jul. 11, 2019 which claims the benefit of U.S. application Ser. No. 62/696,544, filed on Jul. 11, 2018.

SPECIFICATION

Field

The disclosure relates to the use of ionic liquids as corrosion inhibitors.

Background

Corrosion of metallic surfaces is often an acute problem which arises during the production and refining of hydrocarbon streams as well as in other industries which rely on aqueous fluids for the removal of heat from one medium to another. For instance, cooling towers extract waste heat to the atmosphere by cooling of a water stream to a lower temperature. Cooling towers are used in oil refineries, petrochemical and other chemical plants, thermal power stations and power plants, steel mills, natural gas processing plants, food processing plants, semi-conductor plants as well as HVAC systems. Aqueous fluids, including those with high salt content, cause corrosion which may lead to equipment failure requiring equipment to be replaced. Corrosion also decreases plant efficiency due to loss of heat transfer. This is often the result of heat exchanger fouling caused by the accumulation of corrosion products.

Highly corrosive conditions also arise during well stimulation operations, such as pickling, acid washing, matrix acidizing and acid fracturing where aqueous acidic solutions are applied to the production zone to increase the size of pores within the formation and to provide enlarged passageways for the flow of hydrocarbons.

Corrosive aqueous fluids having high salt content are also used in drilling and completion fluids. Marked corrosivity is often seen when such brines are used as packer fluids since they remain in contact with production tubing and casing for extended periods of time.

Concerns of corrosion also arise in the treatment of gas streams, such as carbon dioxide and hydrogen sulfide, which generate highly acidic environments to which metallic surfaces become exposed. For instance, corrosion effects from brine and hydrogen sulfide are seen in flow lines during the processing of gas streams. The presence of methanol, often added to such streams to prevent the formation of undesirable hydrates, further often increases the corrosion tendencies of metallic surfaces.

Further, naturally occurring and synthetic gases are often conditioned by treatment with absorbing acidic gases, carbon dioxide, hydrogen sulfide and hydrogen cyanide. Degradation of the absorbent and acidic components as well as the generation of by-products (from reaction of the acidic components with the absorbent) results in corrosion of metallic surfaces.

Corrosion of metallic surfaces is evidenced by surface pitting, embrittlement and loss of metal. Pitting occurs when anodic and cathodic sites become stationary due to large differences in surface conditions. Once a pit is formed, the solution inside it is isolated from the environment and becomes increasingly corrosive with time. The high corrosion rate in the pit produces an excess of positively charged metal cations, which attract chloride anions. In addition, hydrolysis produces hydrogen ions. The increase in acidity and concentration within the pit promotes even higher corrosion rates, and the process becomes self-sustaining.

Various corrosion inhibitors for diminishing corrosive effects on metal surfaces have been developed. Some corrosion inhibitors can have serious consequences. For instance, sulfur containing corrosion inhibitors may cause corrosion cracking which translates into tubular failures. Such inhibitors further may decompose at elevated bottomhole temperatures and release hydrogen sulfide. The release of hydrogen sulfide as a decomposition product likely induces sulfide stress corrosion cracking of the alloy tubulars. Zinc based corrosion inhibitors have also been used especially to address corrosive effects in cooling towers. Unfortunately, zinc salts, oxides and sulfates often precipitate in cooling water. In alkaline waters, particularly above about pH 7.5, dissolved zinc tends to deposit or drop out. Thus, zinc salts are known to be unstable hi neutral or alkaline water. Scale formation further typically results from the metals in inorganic corrosion inhibitors. For instance, zinc scales typically form by use of zinc containing corrosion inhibitors. The effectiveness of corrosion inhibitors in aqueous systems thus significantly decreases.

Efforts have been undertaken to find more effective corrosion inhibitors which do not render the negative effects of those previously seen. For instance, alternative corrosion inhibitors have been sought which are capable of controlling, reducing or inhibiting corrosion without inducing sulfur-related corrosion cracking of metallic alloy tubulars. Further, there exists a need for improved compositions for inhibiting or preventing corrosion in cooling water systems which are more effective and are more environmentally acceptable compositions.

SUMMARY

In an embodiment, the disclosure relates to the use of electronically neutral ionic liquids as corrosion inhibitors, the ionic liquids represented by (I):

$$A^+X^- \qquad (I)$$

wherein A is or contains nitrogen, a nitrogen containing heterocyclic ring, is or contains phosphorus, or a phosphorus containing heterocycle; and X is an anion selected from the group consisting of halides; hydroxyl; hydroxyl containing nitrogen or sulfur compounds; sulfonates; sulfates; bisulfites; carbonates; alkyl carbonates; bicarbonates; thiocarbonates; dithiocarbonates; trithiocarbonates; xanthates, thiocyanates; alkoxides; carboxylates; hydroxycarboxylates; amino fatty acids; anionic alkoxylated fatty acids; anionic metallic complexes, sulfur or silicon containing anions; sulfides; polysulfides; anionic phosphate esters, anionic thiophosphate esters; anionic phosphonate esters; anionic thiophosphonate esters; alkyl substituted phosphines; anionic urea; anionic thiourea; anionic natural products; anionic thiols; anionic phenols; anionic phenol resins; anionic copolymers of alpha olefins and maleic anhydride, esters, amides, imides or derivatives thereof; anionic acrylamido-methyl propane sulfonate/acrylic acid copolymers; anionic homopolymers, copolymers and terpolymers of one or more acrylates, methacrylates, acrylamides and acids, optionally copolymerized with one or more ethylenically unsaturated monomers; anionic phosphated maleic copolymers; an anionic homo or copolymer of an oxirane or methyloxirane and mixtures thereof or a zwitterion.

Another embodiment relates to the use of ionic liquids as corrosion inhibitors, the ionic liquids represented by (II) and (III):

  (II);

  (III)

wherein:

A in formula (II) is or contains nitrogen or phosphorus or a heterocyclic ring thereof and wherein each A in formula (III) is independently selected from nitrogen or phosphorus or a heterocyclic ring thereof; and X is an anion selected from the group consisting of halides; hydroxyl; hydroxy containing nitrogen or sulfur compounds; carbonates; alkyl carbonates; bicarbonates; carboxylates; hydroxycarboxylates; dithiocarbonates; trithiocarbonates; xanthates, thiocyanates; alkoxides; anionic urea; anionic alkyl substituted phosphines; anionic amino fatty acids; anionic alkoxylated fatty acids; anionic acrylamidomethyl propane sulfonate/acrylic acid copolymers; anionic phosphated maleic copolymers; anionic homo or copolymers of an oxirane or methyloxirane; anionic metal complexes; sulfur or silicon containing anions; anionic phosphate esters; anionic thiophosphate esters; anionic phosphonate esters; anionic thiophosphonate esters; anionic thiols; anionic natural products; anionic phenols; anionic phenol resins; anionic copolymers of alpha olefins and maleic anhydride, esters, amides, imides or derivatives thereof; anionic alkyl substituted phosphines; and anionic homopolymers, copolymers and terpolymers of one or more acrylates, methacrylates and acrylamides, optionally copolymerized with one or more ethylenically unsaturated monomers; and mixtures thereof; and further wherein $R^1$, $R^2$, $R^3$, $R^4$, $R^5$, $R^6$ and $R^7$ are independently selected from the group consisting of hydrogen; benzyl; alkylbenzyl, or oxyalkyl (including —$CH_2CH_2OH$) or —$CH_2CH(CH_3)OH$); a straight or branched alkyl group, an alkylbenzyl group, an arylalkyl group, a straight or branched chain alkenyl group, a hydroxyalkyl group or a hydroxyalkylbenzyl group; and a polyoxyalkylene group; and $R^8$ is a straight or branched alkylene group, an alkylene oxyalkylene, or an alkylene polyoxyalkylene or a zwitterion; and further wherein R groups may be joined to form a heterocyclic nitrogen, sulfur or phosphorus containing ring.

In another embodiment, a method of enhancing the performance of a corrosion inhibitor is provided by contacting the corrosion inhibitor with a corrosion inhibiting ionic liquid. In these instances, the corrosion inhibiting ionic liquid may act as an intensifier for the corrosion inhibitor; the corrosion inhibitor not being an ionic liquid.

DETAILED DESCRIPTION

The description provides specific details, such as material types, compositions, and processing conditions in order to provide a thorough description of embodiments of the disclosure. Characteristics and advantages of this disclosure and additional features and benefits will be readily apparent to those skilled in the art upon consideration of the following detailed description of exemplary embodiments. The description herein, being of exemplary embodiments, is not intended to limit the scope of the claims.

As used herein and throughout various portions (and headings) of this patent application, the terms "disclosure", "present disclosure" and variations thereof are not intended to mean every possible embodiment encompassed by this disclosure or any particular embodiment(s). Thus, the subject matter of each such reference should not be considered as necessary for, or part of, every embodiment hereof or of any particular embodiment(s) merely because of such reference.

Certain terms are used herein and in the appended embodiments to refer to particular components. As one skilled in the art will appreciate, different persons may refer to a component by different names. This document does not intend to distinguish between components that differ in name but not function. Also, the terms "including" and "comprising" are used herein and in the appended embodiments in an open-ended fashion, and thus should be interpreted to mean "including, but not limited to . . . ." Further, reference herein and in the appended embodiments to components and aspects in a singular tense does not limit the present disclosure or appended embodiments to only one such component or aspect, but should be interpreted generally to mean one or more, as may be suitable and desirable in each particular instance. Thus, the use of the terms "a", "an", "the" the suffix "(s)" and similar references are to be construed to cover both the singular and the plural, unless otherwise indicated herein or clearly contradicted by context.

All ranges disclosed herein are inclusive of the endpoints, and the endpoints are independently combinable with each other. Unless stated otherwise, any range of values within the endpoints is encompassed. For example, where the endpoints of a range are stated to be from 1 to 10, any range of values, such as from 2 to 6 or from 3 to 5 will be defined by the range.

All references are incorporated herein by reference.

The phrase "ionic liquid" refers to a neutral molten salt composed entirely of ions and which is liquid at ambient or near ambient temperatures. The phrase shall include the quaternary organic salts of (I), (II) and (III). The ionic liquid functions as a corrosion inhibitor.

The phrase "second corrosion inhibitor" shall refer to any material (other than an ionic liquid) which enhances the performance of an ionic liquid or whose performance is enhanced by an ionic liquid.

The phrase "treatment composition" shall refer to a composition resulting from contact of an ionic liquid with a second corrosion inhibitor. The phrase shall include blends, mixtures, complexes and reactions products of the ionic liquid and second corrosion inhibitor.

As used herein, unless otherwise restricted, "inhibit", "inhibiting" or "inhibition" shall include the inhibition, prevention, reduction or control of corrosion of a metallic surface.

The phrase "corrosion inhibitor" shall refer to a material capable of inhibiting, preventing or reducing corrosion of a metallic surface.

As used herein, "petroleum hydrocarbon fluid" shall include crude oil, shale oil, shale gas condensate, bitumen, diluted bitumen (dil-bit), refinery fractions including distillates including gas oil cuts, finished fuel including diesel fuel, petroleum fuel and biofuel, finished petroleum products, residual oil, fuel gas, flare gas, propane, butane, liquefied petroleum gas (LPG), natural gas liquid (NGL) and combinations thereof. The ionic liquids and treatment compositions described herein are especially useful in the treatment of crude oil, bitumen, diesel fuel, petroleum fuel, biofuel, residual oil, fuel gas, flare gas, propane, butane, liquefied petroleum gas (LPG), natural gas liquid (NGL) and refinery fractions (including gas oil cuts and light lubricating oils) and combinations thereof. In addition, any of these may contain water, brines, gases such as hydrocarbon gases, or a combination thereof.

As used herein, the word "conduit" may refer to any pipeline, pipe, tubing, tubular, flow conduit, thoroughfare or other artery in which a chemical, including a petroleum hydrocarbon fluid, travels or contacts. The word "vessel" shall include any equipment or container in which a petroleum hydrocarbon fluid is in contact, such as heat exchangers, etc. The conduit may, but not limited to, those composed of a metal, plastic or glass. The site of the "conduit" or "vessel" shall include, but not be restricted to reservoirs, wells, pipelines, refineries, fluid processing or treatment facilities (including those where gas or oil production or treatment occur, chemical plants, thermal power stations, power plants, steel mills, natural gas processing plants, food processing plants, semi-conductor plants and HVAC systems) as well as thoroughfares leading to or from any of the above.

The ionic liquids and treatment compositions described herein may be used during the production of crude oil and gas.

In addition, the ionic liquids and treatment compositions may be used during the recovery of petroleum hydrocarbon fluids from underground reservoirs.

The ionic liquids and treatment compositions are most useful during the production of oil and gas from a well and in a refinery operation including light-ends recovery, solid waste and cooling water treatment, process-water treatment, cooling, storage, and handling, product movement, hydrogen production, acid and tail-gas treatment and sulfur recovery.

The ionic liquids and treatment compositions may also be used during the purification or another treatment phase of an industrial product. For instance, the ionic liquids and treatment compositions may be used to treat cooling water streams. Such streams include produced water (aqueous fluids produced along with crude oil and natural gas during from reservoirs water naturally present in oil and gas bearing geological formations, aqueous fluids produced or used during the production of oil and gas from reservoirs or an industrial product, aqueous fluids produced during the refining of oil and gas or an industrial product, aqueous fluids used during the refining of oil and gas or an industrial product, aqueous fluids used or produced during transit or storage of petroleum hydrocarbon fluids or an industrial product). Exemplary water streams include flowback water, degassed sour water, boiler blowdown streams, cooling tower bleed-off/blowdown (originating from oil refineries, petrochemical and natural gas processing plants, other chemical plants, thermal power stations, power plants, steel mills, food processing plants, semi-conductor plants and HVAC systems). Wastewater streams from industrial applications include municipal wastewater treatment facilities, streams in transit to or from municipal wastewater treatment facilities, tanning facilities, and the like. Exemplary products removed during water treatments described herein may include inorganic salts, polymers, breakers, friction reducers, lubricants, acids and caustics, bactericides, defoamers, emulsifiers, filtrate reducers, shale control inhibitors, phosphorus ions, ions of calcium, magnesium and carbonates, bacteria as well other production chemicals.

The ionic liquids and treatment compositions may also be used within a conduit or vessel or introduced into a conduit or vessel. The ionic liquids and treatment compositions may also be used during transit of petroleum hydrocarbon fluids or an industrial product as well as during storage of petroleum hydrocarbon fluid or an industrial product.

The ionic liquid and treatment compositions are typically liquid at relatively low temperature. While the ionic liquids are salts, they typically exhibit high flash points, good solvency for other chemicals and strong basicity.

Suitable ionic liquids are those of the formula (I):

$$A^+X^- \quad (I)$$

wherein A is or contains nitrogen or phosphorus, a nitrogen containing heterocyclic ring or a phosphorus containing heterocyclic ring; and X is an anion selected from the group consisting of halides; hydroxyl; hydroxy containing nitrogen or sulfur compounds; carbonates; alkyl carbonates; bicarbonates; dithiocarbonates; trithiocarbonates; xanthates, thiocyanates; alkoxides; carboxylates; hydroxycarboxylates; amino fatty acids; anionic alkoxylated fatty acids; anionic metallic complexes, sulfur or silicon containing anions; anionic phosphate esters, anionic thiophosphate esters; anionic phosphonate esters; anionic thiophosphonate esters; alkyl substituted phosphines; anionic urea; anionic thiourea; anionic natural products; anionic thiols; anionic phenols; anionic phenol resins; anionic copolymers of alpha olefins and maleic anhydride, esters, amides, imides or derivatives thereof; anionic acrylamido-methyl propane sulfonate/ acrylic acid copolymers; anionic polyacrylamides, anionic aminomethylated polyacrylamides, anionic homopolymers, copolymers and terpolymers of one or more acrylates, methacrylates and acrylamides, optionally copolymerized with one or more ethylenically unsaturated monomers; anionic phosphated maleic copolymers; an anionic homo or copolymer of an oxirane or methyloxirane and mixtures thereof or a zwitterion.

Further, suitable ionic liquids may be those of formula:

$$R^1R^2R^3R^4A^+X^- \quad (II); or$$

$$R^1R^2R^3A^+R^8A^+R^5R^6R^7X^- \quad (III)$$

wherein:

A in formula (II) is or contains nitrogen or phosphorus or a heterocyclic ring thereof and wherein each A in formula (III) is independently selected from nitrogen or phosphorus or a heterocyclic ring thereof; and X is an anion selected from the group consisting of halides; hydroxyl; hydroxy containing nitrogen or sulfur compounds; carbonates; alkyl carbonates; bicarbonates; carboxylates; hydroxycarboxylates; sulfonates; sulfates; bisulfites; thiocyanates; dithiocarbonates; trithiocarbonates; xanthates, thiocyanates; carbamates; dithiocarbamates; sulfides; polysulfides; alkoxides; anionic urea; anionic alkyl substituted phosphines; anionic amino fatty acids; anionic alkoxylated fatty acids; anionic acrylamido-methyl propane sulfonate/acrylic acid copolymers; anionic phosphated maleic copolymers; anionic homo or copolymers of an oxirane or methyloxirane; anionic metal complexes; sulfur or silicon containing anions; anionic phosphate esters; anionic thiophosphate esters; anionic phosphonate esters; anionic thiophosphonate esters; anionic thiols; anionic natural products; anionic phenols; anionic phenol resins; anionic homo or copolymer of oxirane or methyloxirane; anionic copolymers of alpha olefins and maleic anhydride, esters, amides, imides or derivatives thereof; anionic alkyl substituted phosphines; anionic polyacrylamides; anionic aminomethylated polyacrylamide, and anionic homopolymers, copolymers and terpolymers of one or more acrylates, methacrylates, acrylamides and acid; optionally copolymerized with one or more ethylenically unsaturated monomers;

and mixtures thereof; and further wherein $R^1$, $R^2$, $R^3$, $R^4$, $R^5$, $R^6$ and $R^7$ are independently selected from the group consisting of hydrogen; benzyl; alkylbenzyl, or oxyalkyl (including —$CH_2CH_2OH$) or —$CH_2CH(CH_3)OH$); a straight or branched alkyl group, an alkylbenzyl group, an arylalkyl group, a straight or branched chain alkenyl group, a hydroxyalkyl group or a hydroxyalkylbenzyl group; and a polyoxyalkylene group; and $R^8$ is a straight or branched alkylene group, an alkylene oxyalkylene, or an alkylene polyoxyalkylene or a zwitterion; and further wherein R groups may be joined to form a heterocyclic nitrogen, sulfur or phosphorus containing ring.

In an embodiment, cation of (I), (II) or (III) is phosphorus or a phosphorus containing ring and X is an anion selected from the group consisting of hydroxyl; hydroxy containing nitrogen or sulfur compounds; bicarbonates; alkoxides; hydroxycarboxylates; silicon containing anions; anionic amino fatty acids; anionic alkoxylated fatty acids; anionic thiophosphonate esters; alkyl substituted phosphines; anionic urea; anionic thiourea; anionic natural products; anionic phenols; anionic phenol resins; anionic copolymers of alpha olefins and maleic anhydride, esters, amides, imides or derivatives thereof; anionic acrylamido-methyl propane sulfonate/acrylic acid copolymers; anionic homopolymers, copolymers and terpolymers of one or more acrylates, methacrylates and acrylamides, optionally copolymerized with one or more ethylenically unsaturated monomers; phosphated maleic copolymers; an anionic homo or copolymer of an oxirane or methyloxirane and mixtures thereof.

In another embodiment, cation A of formula (I), (II) or (III) is or contains nitrogen or a nitrogen heterocyclic ring and anion X is selected from the group consisting of silicon containing anions; anionic thiophosphonate esters; anionic natural products; anionic phenol resins; alkoxides; anionic copolymers of alpha olefins and maleic anhydride, esters, amides, imides or derivatives thereof or a mixture thereof; amino fatty acids; anionic alkoxylated fatty acids; alkyl substituted phosphines; anionic urea; anionic thiourea; anionic acrylamido-methyl propane sulfonate/acrylic acid copolymers; anionic homopolymers, copolymers and terpolymers containing acrylamide units; anionic phosphated maleic copolymers; anionic oxirane or methyloxirane homo or copolymers; and mixtures thereof.

In another embodiment, the ionic liquid represented by (II) or (III) has a cation A of is nitrogen (for II) and each A in (III) is nitrogen as defined herein and wherein X is an anion selected from the group consisting of anionic metallic complexes; sulfur or silicon containing anions; anionic phosphate esters; anionic thiophosphate esters; anionic phosphonate esters; anionic thiophosphonate esters; anionic thiols; anionic natural products; anionic phenols; anionic phenol resins; anionic copolymers of alpha olefins and maleic anhydride, esters, amides, imides or derivatives thereof amino fatty acids; anionic alkoxylated fatty acids; alkyl substituted phosphines; an oxirane or methyloxirane homo or copolymer; anionic urea; anionic thiourea; anionic acrylamido-methyl propane sulfonate/acrylic acid copolymers; anionic homopolymers, copolymers and terpolymers containing acrylamide units; anionic phosphated maleic copolymers and mixtures thereof; and further wherein $R^1$, $R^2$, $R^3$, $R^4$, $R^5$, $R^6$ and $R^7$ are independently selected from the group consisting of hydrogen; benzyl; alkylbenzyl, or oxyalkyl (including —$CH_2CH_2OH$) or —$CH_2CH(CH_3)OH$); a straight or branched alkyl group, an alkylbenzyl group, an arylalkyl group, a straight or branched chain alkenyl group, a hydroxyalkyl group or a hydroxyalkylbenzyl group; and a polyoxyalkylene group; and $R^8$ is a straight or branched alkylene group, an alkylene oxyalkylene, or an alkylene polyoxyalkylene or a zwitterion; and further wherein R groups may be joined to form a heterocyclic nitrogen, sulfur or phosphorus containing ring.

Preferred ionic liquids are those of (III) having structures $R^1R^2R^3R^4N^+$; $R^1R^2R^3N^+R^8N^+R^5R^6R^7$; $S^+R^1R^2R^3$; $R^1R^2R^3R^4P^+$; and $R^1R^2R^3N^+R^4P^+R^5R^6R^7$.

In one preferred embodiment, anion X of (I), (II) or (III) is a hydroxide, bicarbonate, carbonate, alkyl carbonate or an alkoxide.

In a preferred embodiment, $R^1$, $R^2$, $R^3$, $R^4$, $R^5$, $R^6$ and $R^7$ of formula (II) and (III) are independently selected from the group consisting of a straight or branched $C_{1-30}$ alkyl group, a $C_{7-30}$ alkylbenzyl group, a $C_{7-30}$ arylalkyl group, a straight or branched $C_{3-30}$ alkenyl group, a $C_{1-30}$ hydroxyalkyl group, a $C_{7-30}$ hydroxyalkylbenzyl group, a zwitterion (such as those from oxyalkylation of an amine with an alkylene oxide; or a polyoxyalkylene group; and $R^8$ is a straight or branched $C_{1-30}$ alkylene, an alkylene oxyalkylene, or an alkylene polyoxyalkylene or R groups may be joined to form a heterocyclic nitrogen, sulfur or phosphorus ring; and the anion comprises halides, hydroxide, bicarbonate, carbonate, alkyl carbonates, alkoxides, carboxylates, or a combination thereof; and further wherein $X^-$ is hydroxide, bicarbonate, carbonate, alkyl carbonates, alkoxides, carboxylates, or a combination thereof. In an exemplary embodiment, A of formula (II) or (III) is nitrogen or a nitrogen containing heterocyclic ring and anion X anion is a hydroxide, bicarbonate, carbonate, alkyl carbonate or an alkoxide.

In another preferred embodiment, $R^1$, $R^2$, $R^3$, $R^4$, $R^5$, $R^6$ and $R^7$ of (II) and (III) are independently —H or a $C_{1-20}$ alkyl; wherein at least one (or at least two) of $R^1$, $R^2$, $R^3$, $R^4$, $R^5$, $R^6$ and $R^7$ is a $C_{2-20}$ alkyl, preferably a $C_{6-12}$ alkyl.

Exemplary ionic liquids of formulas (I), (II) and (III) include, but are not limited to, those ionic liquids having a cation of dicocodimethyl ammonium and ditallowdimethyl ammonium. Further specific exemplary ionic liquids are dicocodimethyl ammonium hydroxide, benzyltrimethylammonium hydroxide, ditallowdimethyl ammonium hydroxide, tributylmethylammonium methyl carbonate, tetraethylammonium bicarbonate, tetrapropylammonium hydroxide, coco dimethylethylammonium methyl carbonate, dodecyl trimethylammonium hydroxide, (2-hydroxyethyl) cocoalkyl ammonium hydroxide (including dialkyl, trialkyl, tetralkyl derivatives like dicocodimethyl ammonium hydroxide cocotrimethyl ammonium hydroxide), cocodialkylammonium chloride derivatives (such as (oxydi-2,1-ethanediyl) bis(cocodimethylammonium) chloride), tri-n-butyl methylammonium methyl carbonate, tetrabutylammonium hydroxide, tallowtrimethyl ammonium hydroxide, cocotrialkyl ammonium hydroxide (such as cocotrimethyl ammonium hydroxide), cocodialkylammonium chloride derivatives (such as (oxydi-2,1-ethanediyl) bis(cocodimethylammonium) chloride), hydrogenated tallow trimethyl ammonium hydroxide, dihydrogenated tallow dimethyl ammonium hydroxide, oxydiethylene bis(cocodimethylammonium hydroxide having a structure represented by the formula: $Coco(CH_3)_2N^+(CH_2)_2O(CH_2)_2N^+(CH_3)_2Coco\ (OH^-)_2$ or a combination comprising at least one of the foregoing.

In some instances, the cation of (III) may be a polyamine, meaning the cation may have two or more nitrogen atoms (and in some cases up to 5 nitrogen atoms). In some instances, one or more of the nitrogens of the polyamine may be cationic such that the cation of (III) may be a polyamine containing two or more cationic sites (and in some cases up to 5 cationic sites). In such cases, $R^8$ may correspond to $(-NR^1R^2)_y$ or $(-NR^1R^2R^3)_y$, wherein y corresponds to 1, 2 or 3 to render the number of nitrogen sites and $R^1$, $R^2$ and $R^3$ are as defined above. Specifically, y is 1 when A is a triamine, y is 2 when A is a tetramine and y is 3 when A is a pentamine. Exemplary are cations of diethylenediamine, triethylenetetraamine, tetraethylenepentamine and (bis) hexamethylenetriamine. In other instances, where both of A are phosphorus in (III), the cation may consist of multiple cationic sites on the phosphorus wherein $R^8$ may correspond to $(-PR^1R^2)_y$ or $(-PR^1R^2R^3)_y$ wherein y corresponds to 1, 2 or 3 to render the number of phosphorus sites and $R^1$, $R^2$, nd $R^3$ are as defined above.

As used herein, the term "alkyl" refers to a straight or branched chain, saturated monovalent hydrocarbon group regardless whether straight or branched chain is specifically mentioned or not; "aryl" refers to an aromatic monovalent group containing only carbon in the aromatic ring or rings; "arylalkyl" refers to an alkyl group that has been substituted with an aryl group, with benzyl being an exemplary arylalkyl group; "alkylbenzyl" refers to a benzyl group that has been substituted with an alkyl group in the aromatic ring; "hydroxyalkyl" refers to an alkyl group that has been substituted with a hydroxyl group with 2-hydroxyethyl as an exemplary hydroxyalkyl group; "hydroxyalkylbenzyl" refers to a benzyl group that has been substituted with a hydroxyalkyl group as defined herein in the aromatic ring; "alkylene" refers to a straight or branched chain, saturated, divalent hydrocarbon group, and "alkenyl" refers to a straight or branched chain monovalent hydrocarbon group having at least two carbons joined by a carbon-carbon double bond. The term "substituted" as used herein means that at least one hydrogen on the designated atom or group is replaced with another group, provided that the designated atom's normal valence is not exceeded. Substituted with a group means substituted with one or more groups.

Suitable nitrogen containing heterocyclic rings referenced herein include pyridinium, imidazolinium and a pyrrole cation (including alkylated derivatives thereof). Further reference to "nitrogen" shall include nitrogen containing cations such as an oxyalkylated nitrogen.

In an embodiment, the cation of (I), (II) or (III) is a quaternary amine salt, triethanolamine methyl chloride, oxyalkylated amine, polyamine, oxyalkylated polyimines, cationic melamine acid colloid or an oxyamine such as those of the formula $(CH_3)_2N(CH_2)_xOH$ where x is 1 to 6, preferably 2.

As used herein, a polyoxyalkylene group has a formula

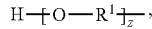

where each occurrence of $R^1$ is independently a $C_{1-10}$ alkylene or $C_{2-8}$ alkylene, specifically ethylene, propylene, butylene, or a combination thereof, and z is an integer greater than 1 such as 2 to 30, 4 to 25, or 8 to 25.

An alkylene polyoxyalkylene group has a formula

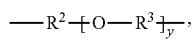

wherein $R^2$ is a $C_{1-30}$ alkylene, each occurrence of $R^3$ is independently a $C_{1-10}$ alkylene or $C_{2-6}$ alkylene, specifically ethylene, propylene, butylene, or a combination thereof, and y is an integer from 1 to 500, such as 2 to 30, 4 to 25, or 8 to 25.

An alkylene oxyalkylene group has a formula of $-R^7-O-R^8-$, wherein $R^7$ and $R^8$ are each independently a $C_{1-20}$, or $C_{1-10}$, or $C_{1-5}$ branched or straight chain alkylene. Optionally, $R^7$ and $R^8$ can be ethylene.

Exemplary halides for the anion $X^-$ are $-Cl$, $-Br$, $-F$ and $-I$. In an embodiment $-Cl$ is preferred.

Suitable sulfur and phosphorus containing anions include sulfates ($SO_4^-$), bisulfate ($HSO_4^-$), thiocyanate ($SCN^-$), thiocarbonate

dithiocarbamates

wherein $R_1$ and $R_2$ are independently selected from $C_{1-20}$ alkyl groups, xanthates

wherein R is a $C_{1-20}$ alkyl, sulfides ($RS^-$) wherein R is a $C_{1-20}$ alkyl, anionic polysulfides ($RS(S)_xS^-$) wherein R is a $C_{1-20}$ alkyl and x is one to five, anionic phosphate esters $[ROP(=O)(OH)_2]$ and anionic phosphonate ester $[R-P(=O)(OH)_2$ (wherein R is a $C_{1-20}$ alkyl or a $C_{1-20}$ oxyalkyl-(RO—); anionic thiophosphate esters

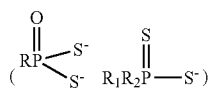

as well as anionic thiophosphonate esters (wherein R is a $C_{1-20}$ alkyl or a $C_{1-20}$ oxyalkyl-(RO—); sulfonates ($RSO_3^-$) wherein R is $C_{1-20}$ alkyl or aryl or alkylaryl group; and anionic thiols (RSH) where R is $-(CH)_xH$ and x is from 1 to 4.

Exemplary oxirane or methyloxirane homo or copolymers include those containing units of the structure $-(CH_2CH_2O)_xCH_2CH(CH_3)O)_y$, where x and y are independently selected from 1 to 1500.

Exemplary anionic metal complexes in formulae (I), (II) and (III) may include, but not be limited to Fe (such as Fe containing anions like $FeCl_4^-$), aluminum (such as Al containing anions like $AlCl_4^-$), etc. Further, the anionic metal complex may be formed from copper, zinc, boron, tin and mixtures thereof.

The anion may further be an anionic natural products like anions of a polysaccharide, polyphenol or lignin. Suitable anions of polysaccharides include anionic starches (such as mixtures of amylose and amylopectin), anionic polyphenols (such as anionic flavonoids or anionic natural polyphenols and anionic tannins (such as water soluble anionic polyphenols with a molecular weight between 500 and 3,000).

Suitable anions may also be anionic phenolics such as anionic phenols, anionic alkyl substituted phenols, anionic phenol oxyalkylates, anionic alkyl substituted phenol oxyalkylates, anionic phenolic or alkylphenol resins and anionic phenol resin oxyalkylates. Typically, the alkyl groups of the anionic phenolics are $C_{1-28}$.

The anion may also be an alkoxide. Suitable alkoxides include those of the formula RO— where R is a $C_{1-30}$ alkyl or cycloalkyl group. In an embodiment, R is $C_{1-18}$ alkyl, $C_{6-12}$ aryl, or $C_{5-12}$ cycloalkyl. Exemplary alkoxides are tert-butoxide, n-butoxide, isopropoxide, n-propoxide, isobutoxide, ethoxide, methoxide, n-pentoxide, isopentoxide, 2-ethylhexoxide, 2-propylheptoxide, nonoxide, octoxide, decoxide and isomers thereof. Preferably, the alkoxides are tert-butoxide, isopropoxide, ethoxide, or methoxide. Tert-butoxide and methoxide are specifically mentioned. The alkoxides may further be anionic ethylene or propylene oxide homopolymers, anionic copolymers or terpolymers (which may optionally be crosslinked). Suitable crosslinking agents include bisphenol A or maleic anhydride.

Suitable alkyl carbonates are those of the formula $ROCO_2^-$, where R is a halogenated or non-halogenated linear or branched alkyl, or hydroxyl alkyl group, preferably a halogenated or non-halogenated linear or branched $C_{1-8}$ or $C_{1-5}$ alkyl group.

Exemplary carboxylates include formate, acetate, propionate, benzoate, n-butyrate, isobutyrate, pivalate, octanoate and laurate, as well as anions of $C_{16}$ fatty acids such as oleate, linolate and stearate. Exemplary hydroxycarboxylates include glycolate, lactate, citrate, glucarate, gluconate and tartrate.

Suitable anionic copolymers of alpha olefins and maleic anhydride, esters, amides, imides (and derivatives thereof) include those of the general structure

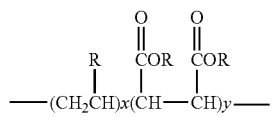

where R is a $C_{1-30}$ alkyl group.

Suitable alkyl carbonates, carboxylates, anionic metal complexes, anionic natural products, anionic phenolics, alkoxides, anionic alpha olefin/maleic anhydride polymers, anionic polymers of acrylates, methacrylates and acrylamides and sulfur cations are those referenced in the paragraphs above.

The ionic liquids of (I), (II), and (III) are salts having a melting point range of −100° C. to 200° C., typically below 100° C. They are generally non-volatile and exhibit low vapor pressures and are environmentally more benign than other organic solvents, such as volatile aromatics and alkanes. They are thermally stable over a wide temperature range with some having a liquid range of up to 300° C. or higher. Typically they are molten salts of organic compounds or eutectic mixtures of organic and inorganic salts. Stability and other fundamental physical properties of the ionic liquids are influenced by the selection of cation while the selection of anion generally determines the functionality of the ionic liquid.

In an exemplary embodiment, ionic liquids disclosed herein may be prepared by first forming a quaternary salt followed by ion exchange with an acid or salt or by an anionic metathesis reaction with an appropriate anion source to introduce the desired counter anion. As an example, a nitrogen or phosphorus containing heterocyclic compound (such as an imidazole or pyridine) may first react with an alkylating agent to form the quaternary salt. The alkylating agent may be an alkyl chloride providing a broad range of alkyl groups on the nitrogen including straight and branched or cyclic $C_1$-$C_{20}$ alkyl groups. The quaternary salt may then be subjected to ion exchange with an acid or salt to form the ionic liquid.

Ionic liquids (I), (II) and (III) may be tailored by varying the cation and anion pairing may be combined with a second corrosion inhibitor to form a treatment composition. In some instances, the amount of ionic liquid in the treatment composition may be from about 3 to about 99 weight percent.

In an embodiment, the anion of the ionic liquid may be the same as the conjugate base of the second corrosion inhibitor. For instance, a suitable ionic liquid may be prepared of formula (II) or (III) where the cation is nitrogen, each of $R_1$, $R_2$, $R_3$ and $R_4$ are hydrogen and anion A is a phosphonate. The ionic liquid functions as a corrosion inhibitor. The treatment composition may consist of the ionic liquid and the second corrosion inhibitor. The conjugate base of the second corrosion inhibitor is a phosphonate, the same as the anion of the ionic liquid.

In some cases, corrosion inhibition improves when the ionic liquid is used in combination with the second corrosion inhibitor. The presence of the ionic liquid in the treatment composition may boost the corrosion inhibition power of the second corrosion inhibitor. (Likewise, the presence of the second corrosion inhibitor in the treatment composition may boost the corrosion inhibition power of the ionic liquid.) The combination of ionic liquid and second corrosion inhibitor may therefore substantially reduce the amount of corrosion and rate of corrosion onto the metallic surface compared to when a fluid containing only one of the ionic liquid or second corrosion inhibitor is used. In one non-limiting example, the presence of the ionic liquid in the treatment composition decreases the rate of corrosion onto a metallic surface by at least 25% and sometimes 50% or higher.

The ionic liquids and/or treatment compositions described herein may exhibit multiple functions. For example, an ionic liquid(s) or treatment composition(s) may be effective as a scale inhibitor as well as a corrosion inhibitor.

One or more ionic liquids and/or treatment compositions may be concurrently used.

The second corrosion inhibitor is preferably a liquid material. If the inhibitor is a solid, it may be dissolved in a suitable solvent, thus making it a liquid.

The ionic liquid and treatment compositions are typically introduced to their targeted location in an organic solvent or in an aqueous fluid such as fresh water, brackish water, brine as well as salt-containing water solutions such as sodium chloride, potassium chloride and ammonium chloride solutions. Suitable organic solvents include alkyl alcohols such as methyl alcohol, ethyl alcohol, propyl alcohol, isopropyl alcohol and butyl alcohol and alkylene glycols like ethylene glycol, propylene glycol. The fluid containing the ionic liquid or treatment composition may further contain one or more surfactants, mutual solvents, sequestering agents, friction reducers, gelling agents, and other conventional additives as well as mixtures thereof.

The amount of ionic liquid or treatment composition in the organic solvent or aqueous fluid is dependent on the corrosive conditions, temperature and intended time of contact. Typically, the amount of ionic liquid or treatment composition in the fluid introduced to the targeted site is from 1 ppm to about 5,000 ppm, or about 1 ppm to about 500 ppm, or about 5 ppm to about 150 ppm.

In an embodiment an effective corrosion inhibiting or preventative amount of the ionic liquid or treatment composition is introduced to an acidic fluid prior to introduction of the acidic fluid into a targeted well or conduit. This may especially be the case where the ionic liquid or treatment composition is used during a well treatment operation as discussed below.

When use of a treatment composition is desired, the ionic liquid and second corrosion inhibitor are first combined and then introduced into the targeted location in the organic solvent or aqueous fluid. At times however, the ionic liquid and second corrosion inhibitor may be introduced in different stages.

The ionic liquid and treatment compositions dramatically inhibit the amount of corrosion and the rate of corrosion on metallic surfaces caused by aqueous acids including mineral acids, like hydrochloric acid, hydrofluoric acid, sulfuric and phosphoric acids as well as weak acids, such as formic acid, acetic acid, hydroxyacetic acid, citric acid, phosphonic acid, methanesulfonic acid and propionic acid as well as other acids affecting industrial operations.

Inhibition of corrosion may be seen on a wide host of metallic surfaces including iron, chromium, ferrous base metals, alloys of steel, alloys of nickel, duplex steels, stainless steel, chrome steel, martensitic alloy steel, ferritic alloy steel, carbon steel, precipitation-hardened stainless steels and the like. Pitting is dramatically reduced when the ionic liquids and treatment compositions are used.

The ionic liquids and treatment compositions may be contacted with a hydrocarbon-containing stream under severe conditions of heat, pressure, agitation and/or turbulence. They may be used at a wide variety of temperatures, typically ranging from 120° F. to 180° F. as well as up to 350° F. beyond.

The ionic liquids and treatment compositions are very useful in the inhibition of corrosion of metallic surfaces during well treatment operations. The treated well may be a hydrocarbon producing well, such as a gas or oil well, or non-hydrocarbon producing wells, such as water injection wells, water producing wells or geothermal wells. They can be used during various types of treatment operations that occur in or before the wellbore and in subterranean formation applications. For example, they can be used in pickling a tubular, cleaning a wellbore, scale treatment, and coiled tubing applications. They can also be used in matrix acid stimulation, acid fracturing, acid tunneling, drilling mud removal, scale treatment, coiled tubing application, or damage removal. Any known method of introducing the ionic liquid(s) or treatment composition(s) into the reservoir can be used. In all of these applications, the ionic liquids and treatment compositions protect metal tubulars and alloy surfaces from acidic fluids that are introduced or produced downhole.

The ionic liquids and treatment compositions can also be used to inhibit corrosion during refining of hydrocarbon fluids, during transport or storage of the fluids or during any period in between.

Further, the ionic liquids and treatment compositions are highly useful in the prevention or inhibition of corrosion attributable to carbon dioxide and hydrogen sulfide. The hydrogen sulfide may be formed when the treating acid contacts a sulfur-containing mineral, such as iron sulfide.

The ionic liquids and treatment compositions are further particularly effective in the treatment of cooling towers relying on aqueous fluids for the removal of heat from one medium to another. As such, the ionic liquids and treatment compositions may be used in oil refineries, petrochemical and other chemical plants, thermal power stations and power plants, steel mills, natural gas processing plants, food processing plants, semi-conductor plants as well as HVAC systems.

Exemplary ionic liquids as corrosion inhibitors include those wherein X in (I), (II) or (III) is an anionic phosphate ester, anionic thiophosphate ester, anionic phosphonate ester; anionic thiophosphonate ester; anionic diphosphonic acid; and anionic carboxylic acids (such as anionic glucaric acid).

Exemplary corrosion inhibitors further those wherein the cation is pyridinium or an imidazolinium as well as quat ammonium halides such as quat ammonium chlorides.

Other corrosion inhibitors include hydroxyl containing nitrogen or sulfur compounds such as alkylated thiols such as those of the formula $HS(CH_2)_xOH$ where x is from 1 to 8, like $HSCH_2CH_2OH$; anionic sulfonyl alcohols such as 2-(methylsulfonyl) ethanol; 2-sulfanylethanol; 2-sulfanyl, propan-1-ol; 2-sulfanylbutan-2-ol; 1-sulfanylbutanol-2-ol and mixtures thereof.

Exemplary ionic liquids include those of structure (IV):

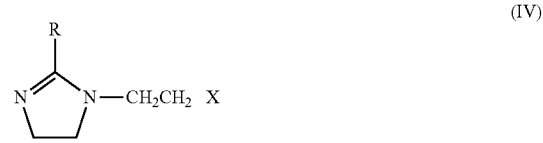

wherein R is a $C_{12}$-$C_{18}$ alkyl or alkenyl group and X is —OH, $NH_2$ or C(=O)R; exemplary phosphate esters or thiophosphate esters are those having one of structures (VA) or (VB):

wherein R is an alkyl or $RO(CH_2CH_2O)_nCH_2CH_2$) and R" and R''' are independently selected from —H and a $C_1$-$C_{20}$ alkyl; exemplary quat ammonium chlorides are those of structure (VI):

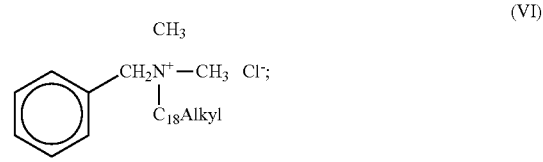

wherein the alkyl group may contain from 1 to 20 carbon atoms; and exemplary alkyl pyridine quats are those of structure (VII):

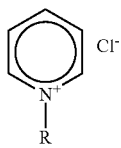

(VII)

wherein R is a $C_1$-$C_{18}$ alkyl or benzyl. In an embodiment, more than one R group can be a substituent to the pyridinyl ring. In such case, the second R group is typically a $C_1$-$C_{12}$ alkyl group.

Further exemplary corrosion inhibitors include thiazoles, triazoles and thiadiazoles such as benzotriazole, tolyltriazole, octyltriazole, decyltriazole, dodecyltriazole, 2-mercaptobenzothiazole, 2,5-dimercapto-1,3,4-thiadiazole, 2-mercapto-5-hydrocarbylthio-1,3,4-thiadiazoles, 2-mercapto-5-hydrocarbyldithio-1,3,4-thiadiazoles, 2,5-bis (hydrocarbylthio)-1,3,4-thiadiazoles, and 2,5-(bis) hydrocarbyldithio)-1,3,4-thiadiazoles.

Suitable anionic groups for anion X of formula (I), (II) and (III) include the counter anions of any of the corrosion inhibitors referenced above. For example, anion X of ionic liquid of formula (I), (II) and (III) may be an anionic phosphate ester, anionic thiophosphate ester, anionic phosphonate ester, anionic thiophosphonate ester, an anionic thiol, etc.

In a preferred embodiment, a treatment composition may be used for the inhibition, prevention or reduction of corrosion of metals; the treatment composition comprising the ionic liquids set forth above and one or more corrosion inhibitors (other than an ionic liquid). Exemplary corrosion inhibitors include those set forth in the paragraphs above. In an embodiment, the anion X of the formula (I), (II) and (III) of the treatment composition may be the same anion as the counter anion of the corrosion inhibitor. For example, the treatment composition may contain (as corrosion inhibitor), the ionic liquid of (II) wherein $R^1$, $R^2$, $R^3$ and $R^4$ are hydrogen and anion X is the counter cation of (I) above.

Pitting of metallic surfaces decreases when metallic surfaces are contacted with the ionic liquids and/or corrosion inhibiting treatment compositions described in the paragraphs above.

Further, corrosion inhibiting treatment compositions have been noted to provide a synergistic effect compared to the ionic liquid or the corrosion inhibitor by themselves. i.e., inhibition, prevention and/or reduction of corrosion significantly increases when fluids are contacted with a corrosion inhibiting treatment composition versus contacting of the metallic surface with the ionic liquid or corrosion inhibitor by themselves.

EXAMPLES

All percentages set forth in the Examples are given in terms of weight units except as may otherwise be indicated.

Example 1. An anion exchange method was followed to prepare sulfur based ionic liquids. A general procedure for the anion exchange method was followed wherein about 1 gram of KOH was dissolved in 5 grams methanol. About 1.36 grams 2-mercaptoethanol was added while stirring at 60° C. for 15 minutes. About 5 grams of a solution of N-benzyl, 2 methyl pyridinium chloride (75%) in methanol (25%) was then added dropwise and the mix stirred at 60° C. After 30 minutes of stirring, the solution was filtered while still hot to remove the potassium chloride by-product. The product was characterized by the replacement of the chloride on the pyridinium by the mercaptide of the 2-mercaptoethanol.

A second procedure which avoided the need to filter the product. The following general procedure was followed. About 1.36 grams of 2-mercaptoethanol was added with stirring at room temp to 8 grams 55% aqueous tetrabutylammonium hydroxide. A slight exotherm occurred on mixing. The mixture was stirred for 15 minutes at 60° C. before 27 grams of a solution containing 36% oxydi-2,1-ethanediyl) bis(cocodimethylammonium) dichloride in 30% water & 30% methanol was added dropwise. The solution was stirred for 30 minutes at 60° C. and cooled and used in all testing without further modification. No filtration was required as the tetrabutylammonium chloride by-product formed in the reaction was soluble in the product.

The synthesis of ionic liquids may be illustrated as follows:

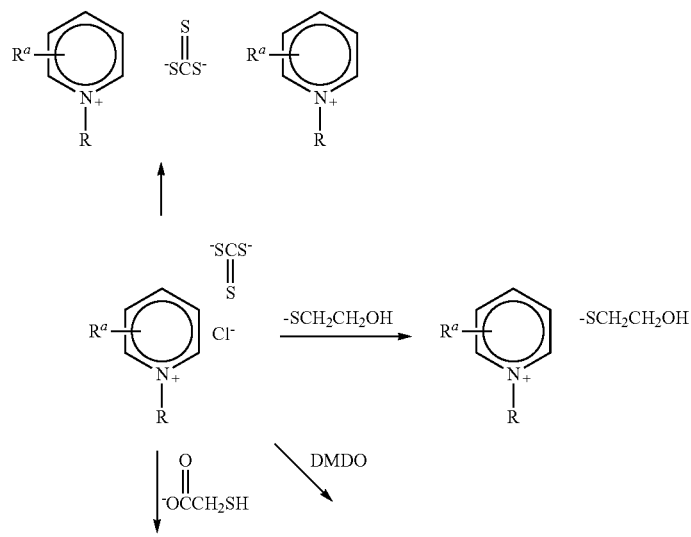

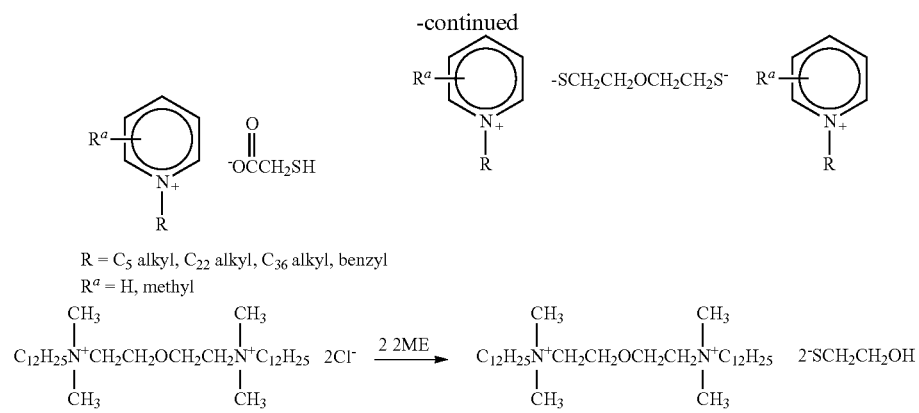

R = C$_5$ alkyl, C$_{22}$ alkyl, C$_{36}$ alkyl, benzyl
R$^a$ = H, methyl

A kettle test run was under the conditions of 10 ppm additive in a brine with a carbon dioxide sparge, run for 18 hours at 180° F. and the corrosion rate (CR) monitored using linear polarization resistance (LPR) probes. The results are set forth in Table I.

TABLE I

| Additive | Additive Dose (ppm) | 17.8 Hour CR |
|---|---|---|
| Untreated | None | 273 (303) |
| oxydi-2,1-ethanediyl) bis(cocodimethylammonium) dichloride (ODEBCAC) | 10 | 233 |
| 2 mercaptoethanol (2ME) | 10 | 76 |
| ODEBCAC/2ME 1:2 salt | 10 | 12 (8) |
| ODEBCAC/2ME 1:1 salt | 10 | 12 |
| N-Octyl pyridinium/2 ME salt | 10 | 11 (8) |
| N-Dodecyl pyridinium/2 ME salt | 10 | 1 (2) |
| N-Hexadecyl pyridinium/2 ME salt | 10 | 1 (2) |
| N benzyl 2 methyl pyridinium chloride(NBMPC) | 10 | 279 |
| NBMPC/2 ME salt | 10 | 4 (4) |
| NBMPC + sodium trithiocarbonate 2:1 salt | 10 | 49 |
| NBMPC + 1,8-Dimercapto-3,6-dioxaoctane (DMDO) 2:1 salt | 10 | 10 |
| NBMPC + DMDO 1:1 salt | 10 | 10 |

Example 2: A neutralization procedure was used to prepare ionic liquids. The general procedure for all tests may be represented by preparation of tetra-n-butylammonium bitartrate (1:1 salt) wherein tartaric acid (10 grams, 0.067 moles) was added in portions to a stirred solution of 55% aqueous tetra-n-butylammonium hydroxide (31.6 grams, 0.067 mole). A slight exotherm occurred during the addition. The solution was stirred at room temperature for an additional 30 minutes before testing without further modification. The samples were then subjected to a kettle test using synthetic cooling water and the corrosion rate was monitored using linear polarization resistance (LPR) probes. The results are set forth in Table II.

TABLE II

| Additive | Active Dose (Ppm) | Corrosion Rate @ 18 hours (MPY) |
|---|---|---|
| Tetra-n-butylammonium bi-tartrate | 98 | |
| " | 65 | 3.7 |
| Tetramethylammonium bi-tartrate | 71 | 5.7 |
| " | 47 | 5.0 |
| Tetraethylammonium bi-tartrate | 60 | 3.9 |
| Ethyl trimethylammonium b-tartrate | 57 | 3.3 |
| " | 38 | 19.0 |
| Benzyltrimethylammonium bi-tartrate | 45 | 12.4 |
| Dodecyltrimethylammonium bi-tartrate | 98 | 16.3 |
| (2-hydroxyethyl)trimethylammonium bi-tartrate | 65 | 2.2 |
| Tetra-n-butylammonium citrate 1:1 salt | 90 | 0.8 |
| Tetraethylammonium citrate 2:1 salt | 90 | 1.0 |
| Tetraethylammonium citrate 1:1 salt | 110 | 1.6 |
| Tetra-n-butylammonium bi-glucarate (1:1 salt) | 86 | 2.0 |
| Tetraethylammonium malate 1:1 salt | 100 | 23.9 |
| (2-hydroxyethyl)trimethylammonium citrate 1:1 salt | 90 | 33.8 |
| (2-hydroxyethyl)trimethylammonium citrate 2:1 salt | 90 | 37.1 |

What is claimed is:

1. A method of inhibiting corrosion of a metallic surface in contact with an acidic or aqueous fluid comprising contacting the acidic or aqueous fluid with a corrosive inhibiting effective amount of an ionic liquid of the formula:

$$R^1R^2R^3A^+R^8A^+R^5R^6R^7X^- \quad (III)$$

wherein:
each A is nitrogen; and
X is an anion selected from the group consisting of sulfur containing anions and hydroxycarboxylates; and
wherein R$^1$, R$^2$, R$^3$, R$^4$, R$^5$, R$^6$ and R$^7$ are independently selected from the group consisting of benzyl; alkylbenzyl, or oxyalkyl; a straight or branched alkyl group, an alkylbenzyl group, an arylalkyl group, a straight or branched chain alkenyl group, a hydroxyalkyl group or a hydroxyalkylbenzyl group; and a polyoxyalkylene group; and R$^8$ is a straight or branched alkylene group, an alkylene oxyalkylene, or an alkylene polyoxyalkylene or a zwitterion.

2. The method of claim 1, R$^1$, R$^2$, R$^3$, R$^4$, R$^5$, R$^6$ and R$^7$ are independently selected from the group consisting of benzyl; oxyalkyl; a straight or branched C$_{1-30}$ alkyl group; a C$_{7-30}$ alkylbenzyl group; a C$_{7-30}$ arylalkyl group; a straight or branched C$_{3-30}$ alkenyl group; a C$_{1-30}$ hydroxyalkyl group; a C$_{7-30}$ hydroxyalkylbenzyl group; and a polyoxyalkylene group; and R$^8$ is a straight or branched C$_{1-30}$ alkylene, an alkylene oxyalkylene, or an alkylene polyoxyalkylene.

3. The method of claim 2, wherein $R^1$, $R^2$, $R^3$, $R^4$, $R^5$, $R^6$ and $R^7$ are independently selected from a $C_{1-20}$ alkyl, —$CH_2CH_2OH$, and $CH_2CH(CH_3)OH$.

4. The method of claim 1, wherein X is a hydroxycarboxylate.

5. The method of claim 4, wherein X is selected from the group consisting of glycolate, lactate, citrate, glucarate, gluconate, and tartrate.

6. The method of claim 1, wherein X is an anion of a polysulfide.

7. The method of claim 6, wherein the anionic polysulfide is of the formula $RS(S)_xS$ wherein R is a $C_{1-20}$ alkyl and x is 1 to 5.

8. The method of claim 1, wherein X is an anion of a hydroxyl containing sulfur anion.

9. The method of claim 1, wherein X is anionic 2-mercaptoethyl mercaptide.

10. The method of claim 1, wherein X is an anionic thiol.

11. The method of claim 1, wherein X is an anion of an alkylated thiol.

12. The method of claim 11, wherein X is an anion of the formula $HS(CH_2)_xOH$ where x is from 1 to 8.

13. The method of claim 12 wherein X is the anion of $HSCH_2CH_2OH$.

14. The method of claim 1, wherein the ionic liquid is present in a treatment composition either containing (i) a second corrosion inhibitor not an ionic liquid; or (ii) a second corrosion inhibitor of an ionic liquid wherein the anion of the ionic liquid and the anion of the second corrosion inhibitor are the same.

15. The method of claim 1, wherein the acidic or aqueous liquid is crude oil, petroleum fuel or oil, a condensate, a distillate or cooling water.

* * * * *

UNITED STATES PATENT AND TRADEMARK OFFICE
CERTIFICATE OF CORRECTION

PATENT NO. : 11,485,915 B2
APPLICATION NO. : 17/545910
DATED : November 1, 2022
INVENTOR(S) : Jerry Weers and Mary Jane Felipe It is certified that error appears in the above-identified patent and that said Letters Patent is hereby corrected as shown below:

In the Claims

Column 18 Line 50 In Claim 1, delete "$R^1$, $R^2$, $R^{3-}$, $R^4$, $R^5$, $R^6$ and $R^7$" and insert --$R^1$, $R^2$, $R^3$, $R^4$, $R^5$, $R^6$ and $R^7$--

Signed and Sealed this
Third Day of September, 2024

Katherine Kelly Vidal
*Director of the United States Patent and Trademark Office*